(12) United States Patent
Shibata et al.

(10) Patent No.: US 7,572,536 B2
(45) Date of Patent: Aug. 11, 2009

(54) METHOD AND APPARATUS FOR FUELING FUEL CELLS

(75) Inventors: Alan Shibata, Camas, WA (US); Timothy A. Longust, Vancouver, WA (US); Jason S. Ord, Portland, OR (US); Justin Romon, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1015 days.

(21) Appl. No.: 10/698,756

(22) Filed: Oct. 31, 2003

(65) Prior Publication Data

US 2005/0095481 A1    May 5, 2005

(51) Int. Cl.
*H01M 8/10* (2006.01)
(52) U.S. Cl. .......................... 429/34; 429/30
(58) Field of Classification Search ............ 429/12, 429/13, 30, 34, 36
See application file for complete search history.

(56) References Cited

U.S. PATENT DOCUMENTS

| | | | |
|---|---|---|---|
| 3,070,748 A | 12/1962 | Worobey et al. | |
| 3,823,038 A * | 7/1974 | Gidaspow et al. | 429/34 |
| 4,261,956 A | 4/1981 | Adlhart | |
| 5,514,353 A | 5/1996 | Adlhart | |
| 5,833,934 A | 11/1998 | Adlhart | |
| 6,057,051 A | 5/2000 | Uchida et al. | |
| 6,194,092 B1 | 2/2001 | Ohara et al. | |
| 6,268,077 B1 | 7/2001 | Kelley et al. | |
| 6,326,097 B1 | 12/2001 | Hockaday | |
| 6,447,945 B1 | 9/2002 | Streckert et al. | |
| 6,475,655 B1 * | 11/2002 | Nakanishi et al. | 429/19 |
| 2001/0049045 A1 | 12/2001 | Hockaday et al. | |
| 2002/0050808 A1 | 5/2002 | Quinones De La Guia | |
| 2002/0088178 A1 | 7/2002 | Davis | |
| 2002/0182459 A1 * | 12/2002 | Hockaday et al. | 429/19 |
| 2003/0082427 A1 * | 5/2003 | Prasad et al. | 429/34 |
| 2005/0118468 A1 * | 6/2005 | Adams et al. | 429/22 |

FOREIGN PATENT DOCUMENTS

| | | |
|---|---|---|
| EP | 1306918 | 5/2003 |
| EP | 1313160 | 5/2003 |
| EP | 1329972 | 7/2003 |
| EP | 1331684 | 7/2003 |
| JP | 2000-331703 | 11/2000 |
| JP | 2004-087159 | 3/2004 |
| JP | 2004-095376 | 3/2004 |
| JP | 2004-265787 | 9/2004 |
| WO | WO02099916 | 12/2002 |

* cited by examiner

*Primary Examiner*—Patrick Ryan
*Assistant Examiner*—Monique Wills

(57) ABSTRACT

A fuel cell is operatively connected to, and powers an electronic device. The fuel cell includes at least one electrode and an electrolyte in electrochemical contact with the electrode(s). A mechanism is provided for delivering fuel to the fuel cell while powering the electronic device.

29 Claims, 2 Drawing Sheets

METHOD AND APPARATUS FOR FUELING FUEL CELLS

BACKGROUND OF THE INVENTION

The present invention relates generally to fueling systems, and more particularly to a fueling system for fuel cells.

Fuel cells use an electrochemical energy conversion of fuel (including but not limited to hydrogen, propane, methane, carbon monoxide, and the like) and oxidant(s) into electricity and heat. It is anticipated that fuel cells may be able to replace primary and secondary batteries as a portable power supply. In fuel cells, the fuel (usually containing a source of hydrogen) is oxidized with a source of oxygen to produce (primarily) water and carbon dioxide. The oxidation reaction at the anode, which liberates electrons, in combination with the reduction reaction at the cathode, which consumes electrons, results in a useful electrical voltage and current through the load.

Batteries powering electronic devices eventually discharge after continuous use and/or after extended periods of non-use. As a result, the user is required to replace and/or recharge the spent battery. In the case of portable electronic devices, the user generally needs to carry the additional batteries with the device. The additional batteries often are bulky and quite heavy. Further, the device generally shuts down during replacement and/or charging of the battery. Still further, if the battery charging requires connection to an alternating current source, the user would need to carry appropriate power cords and to be near the current source.

Some electronic devices incorporate a hydrogen fuel cell system connected to a battery. Generally, the charge/recharge systems for these electronic devices have some drawbacks. Some recharge systems generally start a reaction to form hydrogen gas. However, if such systems are oriented such that the reactants break contact, the reaction generally stops. This break in the reaction interrupts the recharge of the electronic device. As such, a device which is being recharged with such a system generally needs to be turned off before the recharging process begins. An additional drawback with these recharge systems is the reaction that creates the hydrogen gas does not always start immediately, thus causing a delay in the recharging process.

SUMMARY OF THE INVENTION

The present invention substantially solves the problems and/or drawbacks described above by providing a fuel cell operatively connected to, and powering an electronic device. The fuel cell includes at least one electrode and an electrolyte in electrochemical contact with the electrode(s). A mechanism is provided for delivering fuel to the fuel cell while powering the electronic device.

BRIEF DESCRIPTION OF THE DRAWINGS

Objects, features and advantages of the present invention will become apparent by reference to the following detailed description and drawings, in which like reference numerals correspond to similar, though not necessarily identical components. For the sake of brevity, reference numerals having a previously described function may not necessarily be described in connection with subsequent drawings in which they appear.

DETAILED DESCRIPTION OF THE EMBODIMENTS

As will be described further hereinbelow, embodiment(s) of the fueling system of the present invention generally advantageously result in the relatively fast and efficient flow of useable fuel into a fuel cell.

Embodiment(s) of a fuel cartridge of the present invention may generally advantageously result in fuelling the fuel cell without interruption in fuel flow, substantially regardless of the orientation of the cartridge.

Still further, embodiment(s) of the fuel cartridge of the present invention may generally be more amenable for use, as the cartridge substantially prevents the user from coming in contact with the fuel and the waste products.

Figure 1:
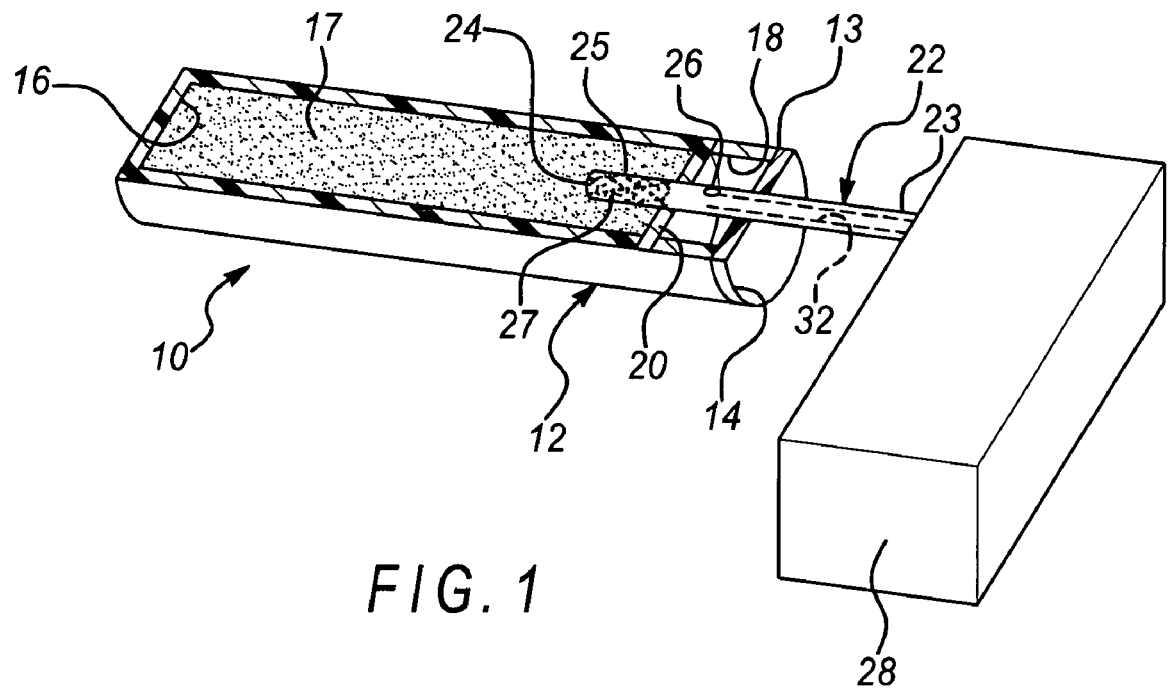
FIG. 1 is a semi-schematic cross-sectional perspective view of a fuel cartridge according to an embodiment of the present invention showing a needle (attached to a fuel cell) inserted therein.

Referring now to FIG. 1, a fuel cartridge 10 according to an embodiment of the present invention includes a housing 12 that defines an enclosed space and has an open end 13. It is to be understood that the housing 12 may be made of any suitable material. Some non-limitative examples of suitable housing 12 materials include, but are not limited to suitable polymeric materials and/or the like. Further, it is to be understood that fuel cartridge 10 may be of any suitable size, shape and/or configuration, as desired and/or necessitated by a particular end use.

In an embodiment, the housing 12 has a septum 14 covering the open end 13, thereby forming an end to the housing 12. It is to be understood that the septum 14 covering the open end 13 may be a barrier to gaseous fuel. In an alternate embodiment, for example, wherein the septum 14 itself is in fluid communication with a fuel cell 28, the septum 14 covering the open end 13 may not be a barrier to gaseous fuel, or may be a partial barrier to gaseous fuel, thus allowing gaseous fuel to flow through. It is to be understood that the septum 14 may be formed from any suitable material which is a barrier, partial barrier, and/or non-barrier to gaseous fuel flow.

In an embodiment of the present invention, the housing 12 enclosed space may be divided into two chambers, the first chamber 16 and the second chamber 18. Further, a chamber-separating septum 20 may separate the first chamber 16 from the second chamber 18. It is to be understood that the chamber-separating septum 20 may be porous and/or partially porous. The chamber-separating septum 20 may also be permeable to gaseous fuel. It is to be understood that the chamber-separating septum 20 may be formed from any suitable material which is porous and/or partially porous to allow permeation of gaseous fuel.

According to an embodiment of the fuel cartridge 10 of the present invention, the first chamber 16 is adapted to contain fuel. It is to be understood that the first chamber 16 may contain any suitable hydrogen fuel. In one embodiment, the hydrogen fuel is a liquid and/or is suspended in a foam material 17. In a further embodiment, the hydrogen fuel is an aqueous solution of sodium borohydride saturated in the foam material 17.

Sodium borohydride ($NaBH_4$) is a powdery white salt whose molecules contain a relatively large amount of hydrogen. When the sodium borohydride reacts with water by way of a chemical catalyst, the result is elemental hydrogen gas ($H_2$), which may provide the energy for a fuel cell 28.

It is to be understood that any suitable foam (natural or synthetic) material 17 may be used to suspend the hydrogen fuel. Non-limitative example(s) of suitable foam material 17 includes any suitable hydrophilic open cell foam. The properties of the foam material 17 may be adjusted depending upon the viscosity and surface tension of the hydrogen fuel contained therewithin. Such adjustments may be carried out by altering and/or changing the components used to make the foam, the conditions of foam manufacture, and/or directly modifying the foam once it has been created. Material interactions may also play a part in the selection of a suitable foam material 17.

Some non-limitative examples of suitable foam materials 17 include, but are not limited to polyurethanes, modified polyurethanes, melamines, melamine/formaldehydes, cellulose, polyethylenes, and/or polypropylenes, and/or mixtures thereof. One non-limitative example of a suitable foam material 17 includes, but is not limited to a controlled porosity ether-type polyurethane foam which has been reticulated to break the membrane walls therein.

A non-limitative embodiment of the present invention includes a fuel cartridge 10 that is inserted into an electronic device. Generally, the reaction (described further hereinbelow) that forms the gaseous fuel stops if the fuel level falls too low to come in contact with the catalyst (on needle tip 24, described below) that initiates the reaction. It is to be understood that the hydrogen fuel saturated in foam material 17 may advantageously position the fuel such that it may substantially continuously react with the catalyst to form gaseous fuel, generally regardless of the orientation of the fuel cartridge 10. This embodiment may be particularly useful in applications wherein the fuel cartridge 10 is inserted into the electronic device in such a manner that gravity acts upon the fuel to cause sporadic and/or non-continuous contact of the catalyst covered tip 24 with the fuel.

In a further embodiment of the fuel cartridge 10 of the present invention, the second chamber 18 is adapted to receive gaseous fuel. In an embodiment of the present invention, the second chamber 18 is a space defined between the chamber-separating septum 20 and the septum 14 covering the end 13. It is to be understood that, in this embodiment, substantially no non-gaseous fuel is contained in the second chamber 18.

In addition, it is to be understood that, in an alternate embodiment of the present invention, the enclosed space of fuel cartridge 10 may be adapted to deliver liquid fuel and/or gaseous fuel other than hydrogen gas. It is to be further understood that the enclosed space may include a single hollow chamber (not shown).

According to an embodiment of the fuel cartridge 10 of the present invention, the chamber separating-septum 20 and the septum 14 covering the end 13 may be adapted to receive a needle 22.

In an embodiment, the needle 22 is connected at one end region 23 to a fuel cell 28. Needle 22 includes a hollow member 32 which is adapted to receive fuel and/or gaseous fuel. In an embodiment, the needle 22 has one or more inlet pore(s) 26 defined in the hollow member 32, the inlet pore(s) 26 being in fluid communication with the hollow member 32. The hollow member 32 may be in fluid communication with the fuel cell 28, thereby ultimately allowing the fuel and/or gaseous fuel to flow to an electrode (anode and/or cathode) in the fuel cell 28.

It is to be understood that any suitable hollow member 32 may be used. In an embodiment, the hollow member 32 is metal. Some non-limitative examples of suitable metals include ruthenium, palladium, platinum, nickel, gold, copper, silver, and/or alloys thereof, stainless steel, and/or mixtures thereof.

In an alternate embodiment of the present invention, the needle 22 has a tip 24 located at a second end region 25 that is distal to the first end region 23. It is to be understood that needle 22 may be of any suitable shape, size and/or configuration, for example it is not necessary that needle 22 be substantially straight.

It is to be understood that the tip 24 may be a closed tip. Further, tip 24 may be coated with a catalyst material 27. In an alternate embodiment, the catalyst material 27 may be bonded to the tip 24 and/or second end region 25 of the needle 22. It is to be understood that any suitable catalyst material 27 may be used. Some non-limitative examples of the catalyst material 27 include, but are not limited to ruthenium, palladium, platinum, nickel, gold, silver, and/or alloys thereof, and/or mixtures thereof.

It is to be understood that in an embodiment of the present invention, the catalyst material 27 is different than the material selected for the needle 22. In an alternate embodiment, the needle 22 and the catalyst material 27 may be the same material, and/or the needle 22 itself may be formed from a catalyst material without having a separate catalyst material 27 thereon.

In an embodiment, the chamber-separating septum 20 and septum 14 covering the end 13 are positioned such that when the needle 22 is inserted into the fuel cartridge 10, the needle tip 24 (having a catalyst material 27 thereon) is received within the first chamber 16, and the inlet pore(s) 26 is received within the second chamber 18.

It is to be understood that the first chamber 16 may define an area for a reaction to take place between the catalyst material 27 and the fuel contained in the first chamber 16. In an embodiment, the reaction produces the gaseous fuel.

In a further embodiment of the present invention, both the chamber-separating septum 20 and the septum 14 covering the end 13 may act as cleaning members for the needle 22. When the needle 22 is inserted into and/or removed from the fuel cartridge 10, the chamber-separating septum 20 and the septum 14 covering the end 13 substantially wipe off any undesirable materials from the needle 22. It is to be understood that the catalyst material 27 coating the tip 24 substantially remains on the tip 24 during and after the cleaning.

Figure 2:
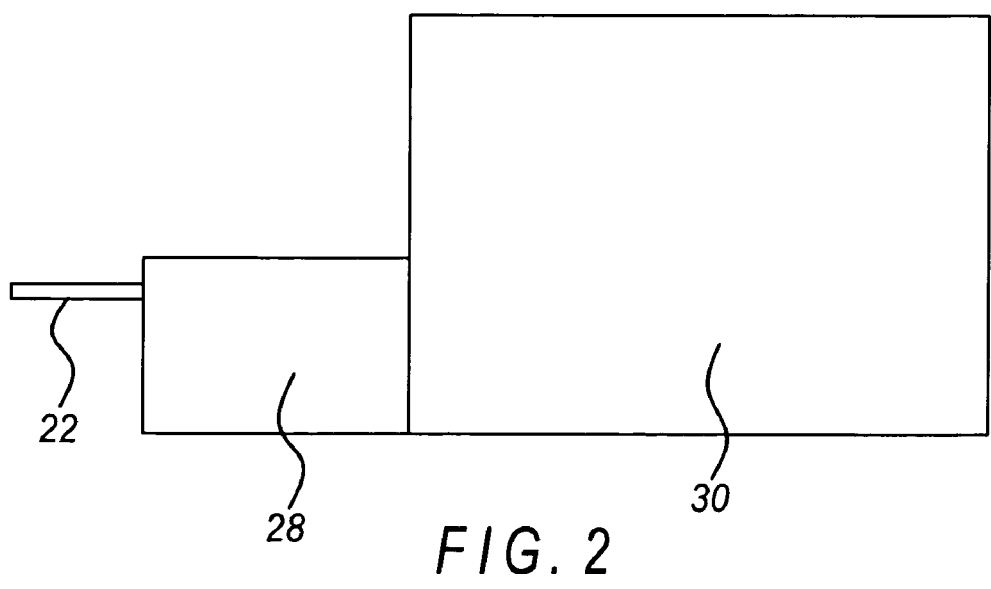
FIG. 2 is a schematic view of an embodiment of the present invention showing a needle connected to a fuel cell and the fuel cell connected to a battery.

Referring now to FIG. 2, an embodiment of the fuel cell 28 according to the present invention includes the needle 22 connected to the fuel cell 28. It is to be understood that any suitable means (including, but not limited to suitable ducting, seals, etc.) may be chosen for connecting the needle 22 to the fuel cell 28, such that the fuel may flow through the hollow member 32 of the needle 22 into the fuel cell 28.

In an embodiment, it is to be understood that the fuel cell 28 may be any suitable hydrogen fuel cell. With this embodiment, it is to be understood that the hollow member 32 of the needle 22 is adapted to receive gaseous fuel. A non-limitative example of the gaseous fuel is hydrogen gas.

In an embodiment of the present invention, any suitable fuel cell 28 may be chosen. Some non-limitative examples of suitable fuel cells 28 include, but are not limited to hydrogen fuel cells, solid oxide fuel cells, proton conducting ceramic fuel cells, alkaline fuel cells, Polymer Electrolyte Membrane (PEM) fuel cells, molten carbonate fuel cells, solid acid fuel cells, and Direct Methanol PEM fuel cells.

With this embodiment, the fuel may be selected from at least one of hydrogen, methane, ethane, propane, butane, pentane, methanol, ethanol, higher straight chain or mixed hydrocarbons, for example, natural gas or gasoline (low sulfur hydrocarbons may be desirable, e.g. low sulfur gasoline, low sulfur kerosene, low sulfur diesel), and mixtures thereof. In an alternate embodiment, the fuel/reactant is selected from the group consisting of butane, propane, methane, pentane, and mixtures thereof.

In a further embodiment of the present invention, the fuel cell 28 may also be operatively connected to a battery 30. It is to be understood that the fuel cell 28 according to the present invention may be adapted to recharge the battery 30 by converting the delivered fuel and/or gaseous fuel into electricity.

Figure 3:
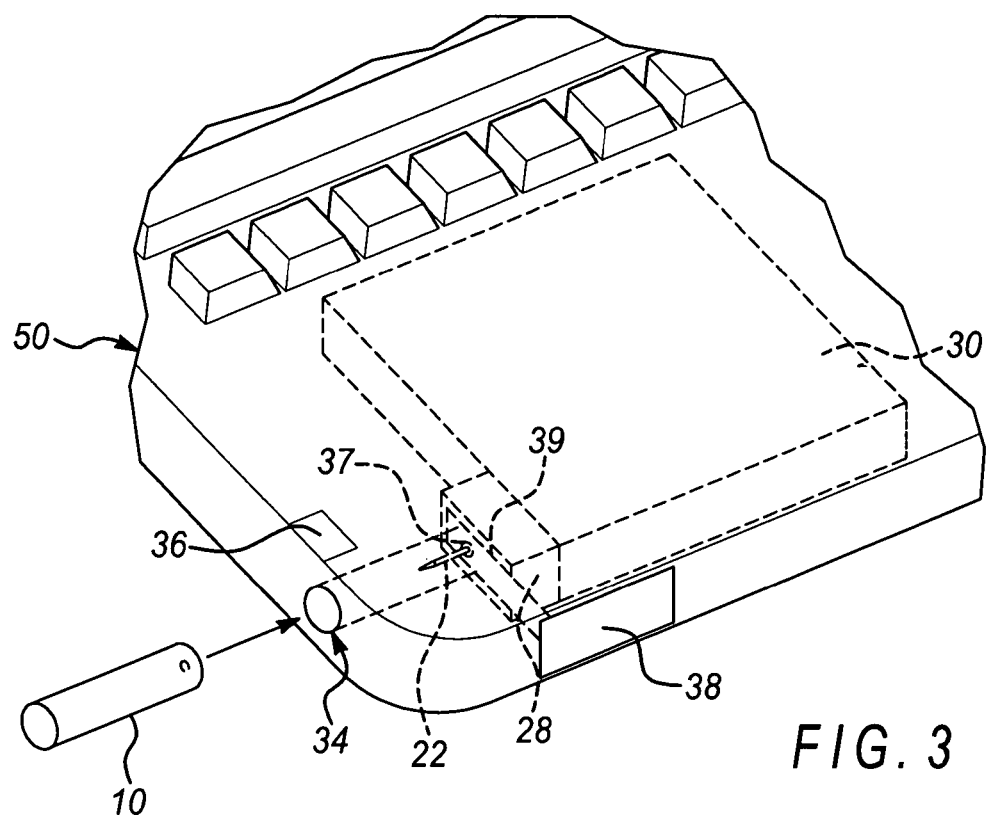
FIG. 3 is an exploded, cutaway perspective view of an electronic device according to an embodiment of the present invention.

Referring now to FIG. 3, an embodiment of the electronic device 50 of the present invention may be, as a non-limitative example, a laptop computer. It is also to be understood that non-limitative embodiments of electronic device 50 may also include any of the examples listed below (in reference to FIG. 4) describing the electrical load L. The laptop computer 50 has a battery 30 operatively disposed therein, which, in turn, is operatively connected to the fuel cell 28 having the needle 22. It is to be understood that the battery 30 may be a rechargeable battery.

In an embodiment of the present invention, the electronic device 50 has a receptacle 34 that is adapted to receive the fuel cartridge 10. It is to be understood that the needle 22 of the fuel cell 28 enters the fuel cartridge 10 upon the cartridge's 10 insertion into the receptacle 34. Further, it is to be understood that the receptacle 34 may be of any suitable size, shape and/or configuration such that the fuel cartridge 10 may be inserted therein.

A method of making a battery recharge system according to an embodiment of the present invention includes the step of operatively connecting fuel cell 28 to a battery 30.

The method further includes the step of inserting the needle 22 into the fuel cartridge 10. In an embodiment, the inserting step may be accomplished by pushing the fuel cartridge 10, such that the needle 22 enters the fuel cartridge 10. In an embodiment, the fuel cartridge 10 is pushed into the receptacle 34 of the electronic device 50. It is to be understood that the receptacle 34 receives the fuel cartridge 10 and enables the insertion of the needle 22 into the fuel cartridge 10, through the septum 14 covering the end 13, and through the chamber-separating septum 20.

In an embodiment, upon inserting the fuel cartridge 10 into the receptacle 34, the needle tip 24, having the catalyst material 27 thereon, is received within the first chamber 16, which contains fuel. In a further embodiment, the inlet pore(s) 26 of the needle 22 is received into the second chamber 18. Upon entering the first chamber 16, the catalyst material 27 reacts with the fuel to form gaseous fuel. In an embodiment, the gaseous fuel is hydrogen gas.

It is to be understood that the reaction may be driven by partial pressures, which are sufficient to drive the formed gaseous fuel through the chamber-separating septum 20, into the second chamber 18, through the inlet pore(s) 26, through the hollow member 32, and into the fuel cell 28.

The fuel cell 28 according to an embodiment of the present invention is adapted to convert the gaseous fuel into electricity and to provide the battery 30 with an electrical charge. It is to be understood that the fuel cell 28 of the present invention generally depletes the gaseous fuel from the cartridge 10 substantially continuously and quickly enough to keep the gaseous fuel flowing substantially without interruption until the fuel is depleted, thereby recharging battery 30 generally without interruption.

In an embodiment of the electronic device of the present invention, an indicator light/message screen 36 may notify the user that the battery 30 is depleted or running low. The user may then insert the fuel cartridge 10 of an embodiment of the present invention into the receptacle 34 as previously described. It is to be understood that in this embodiment, the user may advantageously continue using the electronic device 50 while the fuel cartridge 10, in conjunction with the fuel cell 28, recharges the battery 30.

In a further embodiment of the present invention, indicator light/message screen 36 may notify the user when the battery 30 is fully charged.

It is to be understood that the electronic device 50 may have a lever 38 for ejecting the fuel cartridge 10 from the electronic device 50 upon completion of the recharging. It is to be understood that the lever 38 may be connected to an ejecting arm 39, which has a bore 37 therethrough to accommodate the needle 22. By moving the lever 38, the ejecting arm 39 pushes the fuel cartridge 10 out of the receptacle 34. The user may then remove the fuel cartridge 10 and dispose of it in a garbage or a recycling bin. It is to be understood that any reaction by-products remain in the fuel cartridge 10, thus advantageously substantially eliminating release of by-products into the surrounding environment during use. In an alternate embodiment, ejecting arm 39 may be attached to needle 22, if for example needle 22 had fluidly connected telescoping members (not shown).

Figure 4:
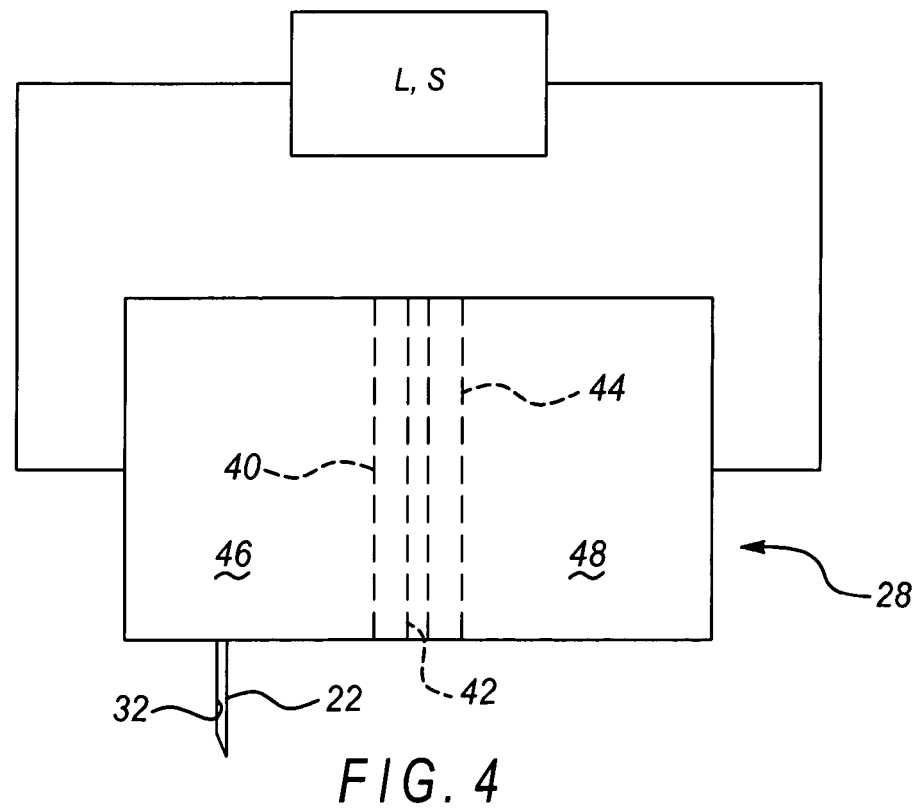
FIG. 4 is a schematic view of an embodiment of the fuel cell of the present invention.

Referring now to FIG. 4, in an embodiment of the present invention, a fuel cell 28 includes at least one electrode 40, 44 in electrochemical contact with an electrolyte 42. It is to be understood that the electrode 40, 44 may be an anode 40 or a cathode 44. The fuel cell 28 according to an embodiment of the present invention has a needle 22 connected to the fuel cell 28, and the hollow member 32 therewithin is adapted to deliver fuel and/or gaseous fuel to the fuel cell 28.

FIG. 4 is a simplified schematic diagram of a dual chamber fuel cell 28. It is to be understood that fuel cell 28 may also be a single chamber fuel cell.

In the fuel cell 28 embodiment(s) of the present invention, oxidants 48 are carried to the cathode 44, and reactants 46 are carried to the anode 40. In an embodiment, the reactants 46 are fuels, and the oxidants 48 are one of oxygen, air, and mixtures thereof. It is to be understood that any suitable hydrogen fuel/reactant 46 may be used with the fuel cell 28 of the present invention in conjunction with the fuel cartridge 10. For example, the fuel 46 may be sodium borohydride when a suitable catalyst is present. In an alternate embodiment of the fuel cell 28, the fuel 46 is one of hydrogen, methane, ethane, propane, butane, pentane, methanol, ethanol, higher straight chain or mixed hydrocarbons, for example, natural gas or gasoline (low sulfur hydrocarbons may be desirable, e.g. low sulfur gasoline, low sulfur kerosene, low sulfur diesel), and mixtures thereof. In a further embodiment, the fuel/reactant 46 is butane, propane, methane, pentane, and/or mixtures thereof. Suitable fuels may be chosen for their suitability for internal direct reformation, suitable vapor pressure within the operating temperature range of interest, and like parameters.

It is to be understood that if fuel cell 28 is a single chamber fuel cell, a gaseous mixture of reactant 46 and oxidant 48 may be directed toward the anode 40 and/or the cathode 44.

An embodiment of a method of using fuel cell 28 includes the step of operatively connecting the fuel cell 28 to electrical load L and/or to electrical storage device S. The electrical load L may include many devices, including, but not limited to any or all of computers (notebooks and/or desktops), cameras, compact disc players, portable electronic appliances (e.g. portable digital assistants (PDAs), portable power tools, etc.), and communication devices, portable or otherwise, both consumer and military. The electrical storage device S may include, as non-limitative examples, any or all of capacitors, batteries, and power conditioning devices. Some exemplary power conditioning devices include uninterruptible power supplies, DC/AC converters, DC voltage converters, voltage regulators, current limiters, etc.

Embodiments of the present invention provide many advantages, examples of which include, but are not limited to the following. Embodiments of the present invention may advantageously result in substantial elimination of the need to carry large, heavy, extra batteries and/or cords for powering and/or recharging the electronic device 50, L. The fuel cartridge 10 of embodiment(s) of the present invention takes advantage of increased energy density, which may advantageously result in a lightweight, easy to use, fuel cartridge recharge system. Embodiments of the present invention further offer the advantage of allowing the user to continue using their electronic device 50, L while the device is recharging. Further, embodiment(s) of the present invention may result in the substantially continuous production of hydrogen gas while the cartridge 10 is installed in the electronic device and contains fuel, generally regardless of the orientation of the fuel cartridge 10. Without being bound to any theory, it is believed that, generally as a result of the catalyst 27 coated needle tip 24, embodiments of the present invention may result in the substantial elimination of reaction start-stop problems that may generally accompany other borohydride based systems. Embodiments of the present invention may also advantageously have a disposable cartridge 10 containing reaction by-products, which substantially eliminates release of by-product waste into the surrounding environment during use. Further, embodiments of the present invention may be more amenable for use, as the cartridge 10 substantially prevents the user from coming in contact with the fuel and the waste products.

While several embodiments of the present invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A fuel cell, comprising:
   at least one electrode;
   an electrolyte in electrochemical contact with the at least one electrode; and
   a needle connected at one end to the fuel cell, the needle comprising:
   a hollow member adapted to receive fuel, the hollow member being in fluid communication with the fuel cell; and
   at least one inlet pore defined in the hollow member;
   wherein the at least one electrode is adapted to receive fuel from the hollow member;
   and wherein the needle is adapted to enter a fuel cartridge, including:
   a housing defining an enclosed space and having an open end, wherein the housing includes:
   a first chamber adapted to contain fuel;
   a second chamber adapted to receive gaseous fuel, the second chamber being separated from the first chamber by a chamber-separating septum adapted to receive the needle, the chamber-separating septum being permeable to the gaseous fuel; and
   a septum covering the open end, wherein the septum covering the open end is adapted to receive the needle.

2. The fuel cell as defined in claim 1 wherein the at least one electrode is one of an anode and a cathode.

3. The fuel cell as defined in claim 1 wherein the hollow member is a metal.

4. The fuel cell as defined in claim 3 wherein the metal is at least one of ruthenium, palladium, platinum, nickel, gold, copper, silver, alloys thereof, stainless steel, and mixtures thereof.

5. The fuel cell as defined in claim 1 wherein the needle further comprises a tip located at a second end distal to the needle one end, the tip having a coating thereon formed from a catalyst material.

6. The fuel cell as defined in claim 5 wherein the catalyst material is a metal.

7. The fuel cell as defined in claim 6 wherein the metal is at least one of ruthenium, palladium, platinum, nickel, gold, silver, alloys thereof, and mixtures thereof.

8. The fuel cell as defined in claim 5 wherein the needle is connected at a first region of the fuel cell, and wherein the fuel cell is adapted to recharge a battery adapted to be operatively connected to the fuel cell at a second region of the fuel cell.

9. The fuel cell as defined in claim 1 wherein the needle enters the fuel cartridge such that the tip is received within the first chamber and the at least one inlet pore is received within the second chamber.

10. The fuel cell as defined in claim 9 wherein the first chamber defines an area for a reaction to take place between the catalyst material coated on the tip and the fuel contained in the first chamber, wherein the reaction produces the gaseous fuel.

11. The fuel cell as defined in claim 10 wherein the reaction is driven by partial pressures, thereby driving the gaseous fuel into the second chamber through the chamber-separating septum, through the at least one inlet pore, through the hollow member, and into the fuel cell.

12. An electronic device, comprising:
    a load; and
    a fuel cell as defined in claim 5 connected to the load.

13. The electronic device as defined in claim 12 wherein the hollow member is a metal.

14. The electronic device as defined in claim 13 wherein the metal is at least one of ruthenium, palladium, platinum, nickel, gold, copper, silver, alloys thereof, stainless steel, and mixtures thereof.

15. The electronic device as defined in claim 12 wherein the catalyst material is a metal comprising at least one of ruthenium, palladium, platinum, nickel, gold, silver, alloys thereof, and mixtures thereof.

16. The electronic device as defined in claim 12, further comprising a receptacle adapted to receive the fuel cartridge, whereby the needle of the fuel cell is inserted into the fuel cartridge.

17. The electronic device as defined in claim 16 wherein the fuel is a hydrogen fuel.

18. The electronic device as defined in claim 17 wherein the hydrogen fuel is an aqueous solution of sodium borohydride.

19. The electronic device as defined in claim 18 wherein the sodium borohydride solution is suspended in a foam material.

20. The electronic device as defined in claim 19 wherein the foam material is at least one of polyurethanes, modified polyurethanes, melamines, melamine/formaldehydes, cellulose, polyethylenes, polypropylenes, and mixtures thereof.

21. The electronic device as defined in claim 16 wherein the chamber-separating septum is at least one of porous and partially porous.

22. The electronic device as defined in claim 16 wherein the septum covering the end of the fuel cartridge is a barrier to hydrogen gas.

23. The electronic device as defined in claim 16 wherein the fuel cell is adapted to recharge a battery operatively connected within the electronic device.

24. The electronic device as defined in claim 23, wherein the fuel cartridge enters the receptacle whereby the needle enters the fuel cartridge such that the needle tip is received within the first chamber and the at least one inlet pore of the hollow member is received within the second chamber.

25. The electronic device as defined in claim 24 wherein the first chamber defines an area for a reaction to take place between the catalyst material coated on the tip and the fuel contained in the first chamber, wherein the reaction produces the gaseous fuel.

26. The electronic device as defined in claim 25 wherein the reaction is driven by partial pressures, thereby driving the gaseous fuel into the second chamber through the chamber-separating septum, through the at least one inlet pore, through the hollow member, and into the fuel cell, wherein the fuel cell converts the gaseous fuel into electricity, thereby recharging the battery.

27. A method of using a fuel cell, comprising the step of:
operatively connecting the fuel cell to at least one of an electrical load and an electrical storage device, the fuel cell comprising:
at least one electrode;
an electrolyte in electrochemical contact with the at least one electrode; and
a needle connected at one end to the fuel cell, the needle comprising:
a hollow member adapted to receive fuel, the hollow member being in fluid communication with the fuel cell; and
at least one inlet pore defined in the hollow member;
wherein the needle is adapted to enter a fuel cartridge, including:
a housing defining an enclosed space and having an open end,
wherein the housing includes:
a first chamber adapted to contain fuel;
a second chamber adapted to receive gaseous fuel, the second chamber being separated from the first chamber by a chamber-separating septum adapted to receive the needle, the chamber-separating septum being permeable to the gaseous fuel; and
a septum covering the open end, wherein the septum covering the open end is adapted to receive the needle;
wherein the at least one electrode is adapted to receive fuel from the hollow member, wherein the fuel cell converts the fuel to electricity, and wherein at least one of the load and the storage device receives the electricity from the fuel cell.

28. The method as defined in claim 27 wherein the at least one electrode is one of an anode and a cathode.

29. A fuel cell operatively connected to and powering an electronic device, the fuel cell comprising:
at least one electrode;
an electrolyte in electrochemical contact with the at least one electrode; and
means for delivering fuel to the fuel cell while powering the electronic device;
wherein the means for delivering is adapted to enter a fuel cartridge, including:
a housing defining an enclosed space and having an open end, wherein the housing includes:
a first chamber adapted to contain fuel;
a second chamber adapted to receive gaseous fuel, the second chamber being separated from the first chamber by a chamber-separating septum adapted to receive the needle, the chamber-separating septum being permeable to the gaseous fuel; and
a septum covering the open end, wherein the septum covering the open end is adapted to receive the needle.

* * * * *

UNITED STATES PATENT AND TRADEMARK OFFICE
CERTIFICATE OF CORRECTION

PATENT NO. : 7,572,536 B2 Page 1 of 1
APPLICATION NO. : 10/698756
DATED : August 11, 2009
INVENTOR(S) : Shibata et al.

It is certified that error appears in the above-identified patent and that said Letters Patent is hereby corrected as shown below:

On the Title page, in Item (75), Inventors, in column 1, line 4, delete "Justin Romon" and insert -- Justin Roman --, therefor.

Signed and Sealed this

Twenty-seventh Day of April, 2010

David J. Kappos
*Director of the United States Patent and Trademark Office*